United States Patent [19]

Thompson

[11] 3,922,619

[45] Nov. 25, 1975

[54] COMPRESSED DIFFERENTIAL PULSE CODE MODULATOR

[75] Inventor: John Stewart Thompson, New Shrewsbury, N.J.

[73] Assignee: Bell Telephone Laboratories, Incorporated, Murray Hill, N.J.

[22] Filed: Jan. 28, 1974

[21] Appl. No.: 437,155

[52] U.S. Cl. .............................. 332/11 D; 325/38 B

[51] Int. Cl.² .............................. H03K 13/22

[58] Field of Search ....... 332/11 R, 11 D; 325/38 R, 325/38 B

[56] References Cited

UNITED STATES PATENTS

| | | | |
|---|---|---|---|
| 3,526,855 | 12/1970 | McDonald | 332/11 D |
| 3,628,148 | 12/1971 | Brolin | 332/11 D X |
| 3,652,957 | 3/1972 | Goodman | 332/11 D |
| 3,706,944 | 12/1972 | Tewksbury | 325/38 B |
| 3,806,806 | 4/1974 | Brolin | 332/11 D X |

*Primary Examiner*—Alfred L. Brody
*Attorney, Agent, or Firm*—R. A. Ryan

[57] ABSTRACT

An adaptive n-bit DPCM encoder includes a standard delta modulator (DM) and n-bit counter to count the output pulses from the DM in forming a DPCM code word. A register stores a digital representation of the current step size which is updated after $2^n$ input sample periods. Because the step sizes are constrained to be proportional to integer powers of 2 and because both the step-size representation and the contents of the n-bit counter are transmitted together, it is always possible to linearize the DPCM code, e.g., prior to digital filtering, by merely shifting a number of bit positions indicated by the step size. A complementary transition is performed by a disclosed decoder.

6 Claims, 7 Drawing Figures

COMPRESSED DIFFERENTIAL PULSE CODE MODULATOR

FIELD OF THE INVENTION

The present invention relates to apparatus and methods for coding analog signals in digital form suitable for transmission over a digital transmission system. More particularly, the present invention relates to apparatus and methods for generating linearizable adaptive delta modulation signals. The present invention also relates to apparatus for linearizing and ultimately decoding such adaptive delta modulated signals.

BACKGROUND OF THE INVENTION

With the advent of improved digital circuitry and the pressures to substantially increase the number of transmission paths for interconnecting data terminals and data processing systems, as well as voice subscribers, improved methods and apparatus for efficiently transmitting coded signals over the telephone network have been developed. An important aspect of such developments is the use of delta modulation (DM) techniques. A useful tutorial discussion of DM in its various applications appears in "Delta Modulation" by H. R. Schindler, *IEEE Spectrum*, Oct. 19, 1970, pages 69–78.

Basically, delta modulation techniques involve the conversion of a continuous analog signal to generate a discrete digital signal. In the simplest configuration, either of two values is generated by a delta modulation encoder. Thus, in this simplest "single-step-size" delta modulator an analog input signal to be encoded and transmitted is sampled at the rate $f_s$ and compared with a reference signal to yield a sequence of positive and negative digital pulses. A positive pulse is generated when the sampled signal exceeds the reference signal and a negative pulse is generated when the reference signal exceeds the input sample. The digital pulses are transmitted over the transmission medium and are also fed back to an integrator whose output increases or decreases in discrete, single-valued steps $\sigma_0$. The updated integrator output signal is then used as the reference signal, the analog input signal and this reference signal being applied to a comparator whose output is sampled as above.

To reconstruct an approximation of the original analog signal at a receiver, one can simply accumulate the positive and negative pulses in a reversible counter. The resulting quantized "count" signal can then be sampled and smoothed in standard fashion to produce the desired approximate signal.

Because the steps are all of equal size, one of the inherent drawbacks of conventional nonadaptive DM is an inability to follow an analog input signal whose change in amplitude from one sampling instant to the next exceeds the basic step size $\sigma_0$ of the system. This inability to follow a rapidly varying analog input signal results in so-called "slope overload distrotion." The problem of slope overload distortion cannot be satisfactorily corrected by merely increasing the basic step size, since then an increase in quantizing noise would result at the smaller analog input signal amplitudes. Therefore, in spite of its simple circuit structure, nonadaptive DM retains the disadvantage of requiring a high sampling rate which, in turn, necessitates a large channel bandwidth.

A number of techniques have been suggested which involve the modification of DM step size as a function of previous signal conditions, i.e., the process of coding is made adaptive. For example, if two consecutive coder outputs are identical (e.g., positive or negative pulses), it may be required that the step size for the following comparison be doubled. A particularly advantageous adaptive delta modulation (ADM) system is that described in U.S. Pat. No. 3,706,944 issued Dec. 19, 1972 to S. K. Tewksbury.

As can readily be appreciated, ADM systems involve an additional level of complexity not required in nonadaptive DM systems. For example, in adaptive delta modulation systems a typical technique for decoding requires the essential duplication of apparatus provided at the encoder. The present invention seeks to overcome the need for such unnecessary duplication at the decoder.

An important consideration in any digital transmission system is the minimization of noise introduced by the system. In the process of rounding or quantizing an analog signal to generate a digital equivalent, there is necessarily introduced an error signal which upon transmission assumes the characteristics of noise. To the degree that the quantized signal is accurately representative of the input analog signal, however, the noise will be reduced. In no case, however, can the transmission of quantized representations of continuous analog signals be noise free. An important consideration, and one motivating the use of adaptive delta modulation, is the minimization of such noise. It is therefore a further object of the present invention to provide means for encoding and decoding in a transmission system in such manner as to minimize quantization noise.

A recent development in transmission technology has been the increased use of so-called digital filters to perform significant signal modification functions equivalent to those previously provided by active and passive analog filter circuits. The equivalent of standard analog signal shaping functions are accomplished in digital filters by relatively simple arithmetic and logical operations on digital data. A useful tutorial reference on the subject of digital filters is *Digital Signal Processing*, L. R. Rabiner and C. M. Rader (Editors), IEEE Press, 1972. Important classes of digital filters in transmission technology are those used to separate signals from noise, and individual signals from each other. Coded signals which lend themselves readily to being digitally filtered clearly offer significant advantages.

It occurs, however, that in many prior art adaptive delta modulation systems, including multibit DPCM, significant computational difficulties are encountered in performing the required digital filtering operations. An appreciation of how such difficulties can occur may be obtained by considering the technique employed in basic manual arithmetic operations. Before two multi-digit numbers may be added, subtracted or multiplied, it is usually necessary to justify or align digit positions so that, for example, the respective units digits appear in the same column, as do the respective tens digits, etc. This alignment (or what is equivalent, appropriate weighting) of operands will be referred to in the sequel as linearization. In binary arithmetic, operands must be suitably linearized with the significance of consecutive digit positions related powers of 2 so that, for example, borrow and carry operations may be correctly performed.

In digital filtering, sequential signals representative of arithmetic operands must be similarly linearized. While it is readily apparent that two arithmetic operands may be linearized by appropriate position shifting, a simple fixed shift will not suffice in the case of adaptive delta modulation signals. This occurs because of the lack of a fixed numerical significance for bit positions in given data sequences. That is, a first operand may have a particular significance associated with a particular digit position, while a second operand may have a different significance attached to the same digit position. It is therefore a further object of the present invention to provide apparatus and methods for generating easily linearizable digital codes amenable to filtering by standard digital filtering apparatus.

The DM and ADM systems described above have, of course, been limited to one bit per sample codes. That is, each transmitted signal represents only a single binary digit, albeit with variable significance. In practice, it proves convenient to reduce the number of transmitted signals, and hence the required transmission bandwidth as much as possible consistent with other system constraints. Thus it is not uncommon to use n-bit differential pulse code modulation (DPCM) instead of simple DM or ADM. DM, of course, is merely one-bit DPCM.

The present invention provides means for converting adaptive single-bit DPCM (DM) signals into compressed, readily linearizable DPCM format.

SUMMARY OF THE INVENTION

The present invention provides means for generating compressed DPCM signals derived from an adaptive DPCM encoder, which signals are representative of a continuous input analog signal. To permit the generation of linearized versions of the adaptive DPCM signals, there is appended to each DPCM code an additional code representative of the step size used in generating the DPCM code.

These coded signals are generated in accordance with an illustrative embodiment by generating a DM signal in standard fashion based on a current step size. The DM signals are accumulated in an *n*-bit counter to form an n-bit DPCM code, while keeping the step size constant. After $2^n$ input signal sample intervals, the step size is updated to a new value based on the accumulated DPCM code, the DPCM code is transmitted along with a code representative of the step size used in forming the DPCM code, and the entire process is repeated. The step sizes are advantageously constrained to be related as powers of 2, i.e., $$2S_{i-1} = S_i = S_{i+1}/2.$$

To linearize the transmitted DPCM code (for digital filtering, multiplexing or for other purposes) the step size signals are used to control the shift of the DPCM codes through the specified number of digit positions. For example, if the step size were indicated by the binary sequence 011, the DPCM code would be shifted $2^3 = 8$ bit positions to align it with other, perhaps fixed-step size DPCM codes.

Upon decoding of a compressed DPCM code, this code is used to generate a number of pulses proportional to its accumulated value.

Similarly, the step size signals are used to generate a number of pulses related to the step size. These sets of pulses are then used to apply a corresponding incremented voltage on an integrating circuit. The output voltage from this integrator (analog filtered, as desired) represents a reconstructed version of the original input signal.

DETAILED DESCRIPTION

Figure 1:
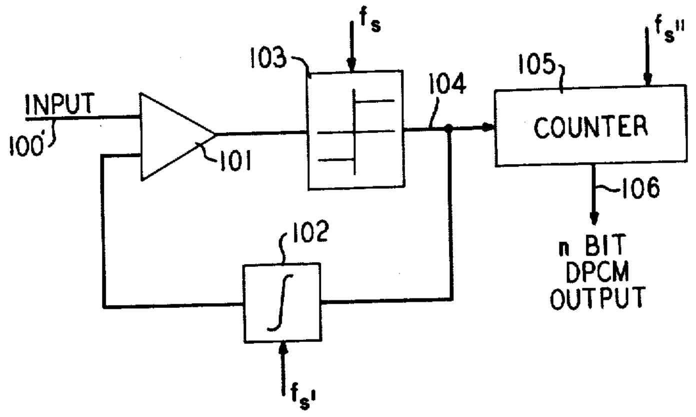
FIG. 1 PRIOR ART
FIG. 1 shows a typical prior art delta modulation system including means for converting to n-bit DPCM.

FIG. 1 shows a prior art combined DM encoder and DM-to-DPCM converter. A continuous analog signal is presented on input lead 100. This signal is compared by comparator 101 with the reference signal output of integrator 102. Latch circuit 103 provides either of two constant output values (1 or 0) depending on whether the comparator output indicates that the signal on lead 100 is greater than or less than the reference signal. The latch circuit 103 is reset with frequency $f_s$, thereby providing on lead 104 a data sequence with a bit rate $f_s$. This output from latch circuit, as described above, is then sampled (at a rate $f_s'$ ) and applied to integrator 102 to modify the reference signal.

The output sequence on lead 104 is then applied to counter 105 which counts the number of 1s and 0s during each interval or duration $1/f_s''$ . Counter 105 is typically incremented for each 1; each 0 leaves the count unaffected. The output on lead 106 is then sampled immediately prior to resetting, resulting in a single n-bit DPCM output, where $n = \log_2(f_s/f_s'')$, and $n$ is an integer. Resetting to an all-zero value permits the counter to reflect maximum positive and negative differential values.

In FIG. 1 the circuitry other than counter 105 may be considered to be a DM coder, while the counter 105 (and associated clock signal source) forms the DM-to-DPCM converter. When ADM features are desired, the DM coder of FIG. 1 may be modified to include means for applying a variable increment to the integrator. This is shown in the ADM coder 210 of FIG. 2 where a plurality, N, of signal sources 201-1 through 201-N are shown charging a capacitor 202. Each of signal sources 201-i provides an amount of charge $Q_i$ (positive or negative) indicative of the current step size $\delta_i$. ($i$=1,2 . . . N.) Not shown explicitly are the usual resistor discharge networks for initializing and maintaining normal dynamic circuit operation, i.e., the capacitor 202 represents an idealization of practical integrators known in the art. Signal sources **201-*i* are selected in response to latch circuit 203, which reflects the required polarity for $\delta_i$, and respective selection gates 204-*i*. Gates 204-*i* are, in turn, responsive to a coded representation of the current step size, stored in register 205, as decoded by one-out-of-N decoder 206.**

Each of the circuits 201-i typically assumes the form of a charge parceling integrator described, for example, in "Delta Modulation Codes for Telephone Transmission and Switching Applications," by R. R. Laane and B. T. Murphy, *Bell System Technical Journal*, Vol. 49 (1970), pp. 1013 et seq., and U.S. Pat. No. 3,750,143 issued July 31, 1973 to T. L. Osborne. In typical operation, one of the circuits 201-*i* is gated on, thereby resulting in a voltage increase on capacitor 202 of $k\delta$, where $\delta$ is the unit step size and $k$ is the multiple of this step size dictated by the contents of register 205 ($\delta_k$ in FIG. 2 denotes the step size $k\delta$). The contents of the register 205 are generated independently in accordance with the particular adaptive algorithm adopted. See U.S. Pat. No. 3,706,944 issued Dec. 19, 1972 to S. K. Tewksbury for a typical system related to the organization of FIG. 2.

Figure 2:
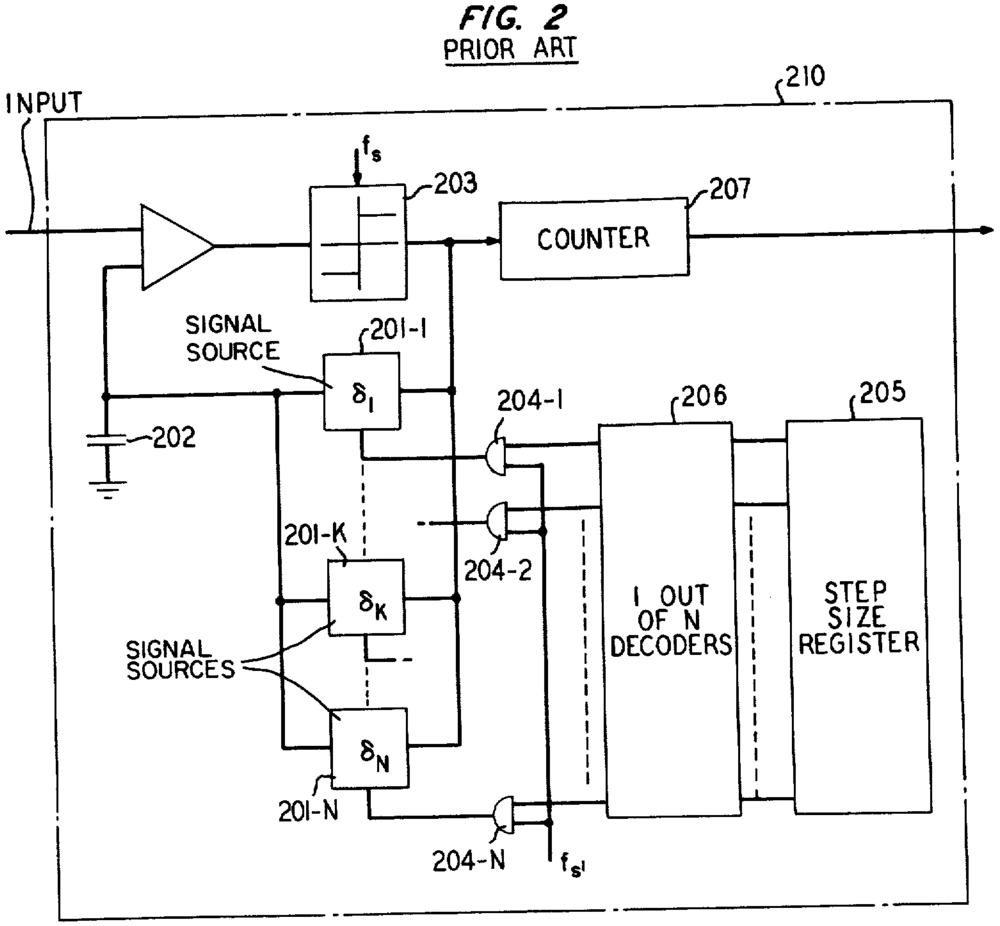
FIG. 2 PRIOR ART
FIG. 2 shows an ADM modification to the system shown in FIG. 1.

It should be understood that if a counter 207 be appended to the ADM coder as shown in FIG. 2 that some ambiguity exists with regard to the value of the compressed DPCM code words transmitted. That is, the counter, being responsive only to the net number of 1s generated by latch circuit 203, does not account for the variability of step size.

Figure 3:
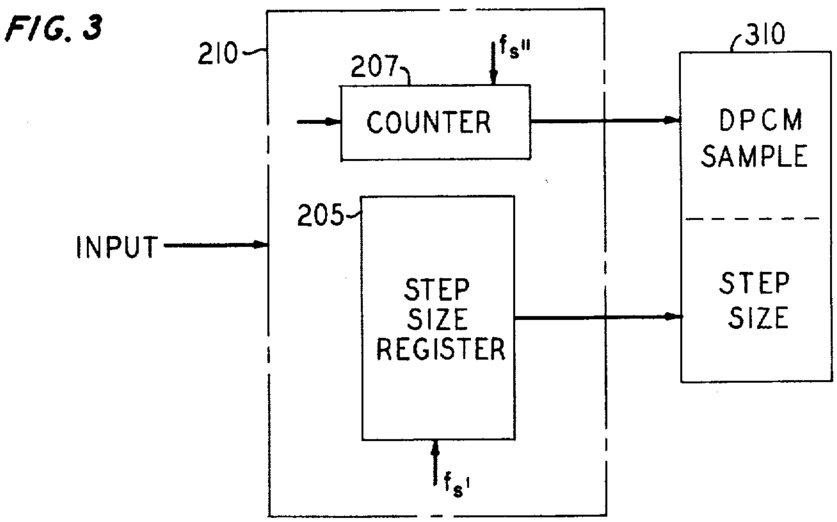
FIG. 3 shows in general form a DPCM encoder based on the present invention including means for storing the current step size.

Accordingly, the present invention provides for a modification of the circuits of FIGS. 1 and 2 by interposing an additional register responsive not only to the output of a counter such as 207 in FIG. 2, but also the contents of the step size register 205 in FIG. 2. FIG. 3 shows such a modification including the register 310 receiving an input from a counter 207 like that in FIG. 2 and from a step size register 205 like that in FIG. 2.

By definition, the contents of register 207 in FIGS. 2 and 3 at a given sample time identified by one of the clock signals $f_s''$ is representative of a quantized linear approximation of the slope of the input signal during that interval. Since DM encoders tend to be slope limited, it proves convenient to use the contents of the portion of register 310 containing the DPCM samples to determine a subsequent step size. Thus, if the $n$-bit signal stored in this portion of the register indicates a very large or small value, the DM encoder is operating at or near its positive or negative slope limit, respectively, for the current step size, as indicated by the $m$-bit value stored in the step size portion of register 310. This indicates that the step size should be increased. Similarly, if the count in the DPCM sample portion of register 310 indicates a mid-range value, the DM encoder is hunting about the true sample value; the step size should be decreased.

Figure 4:
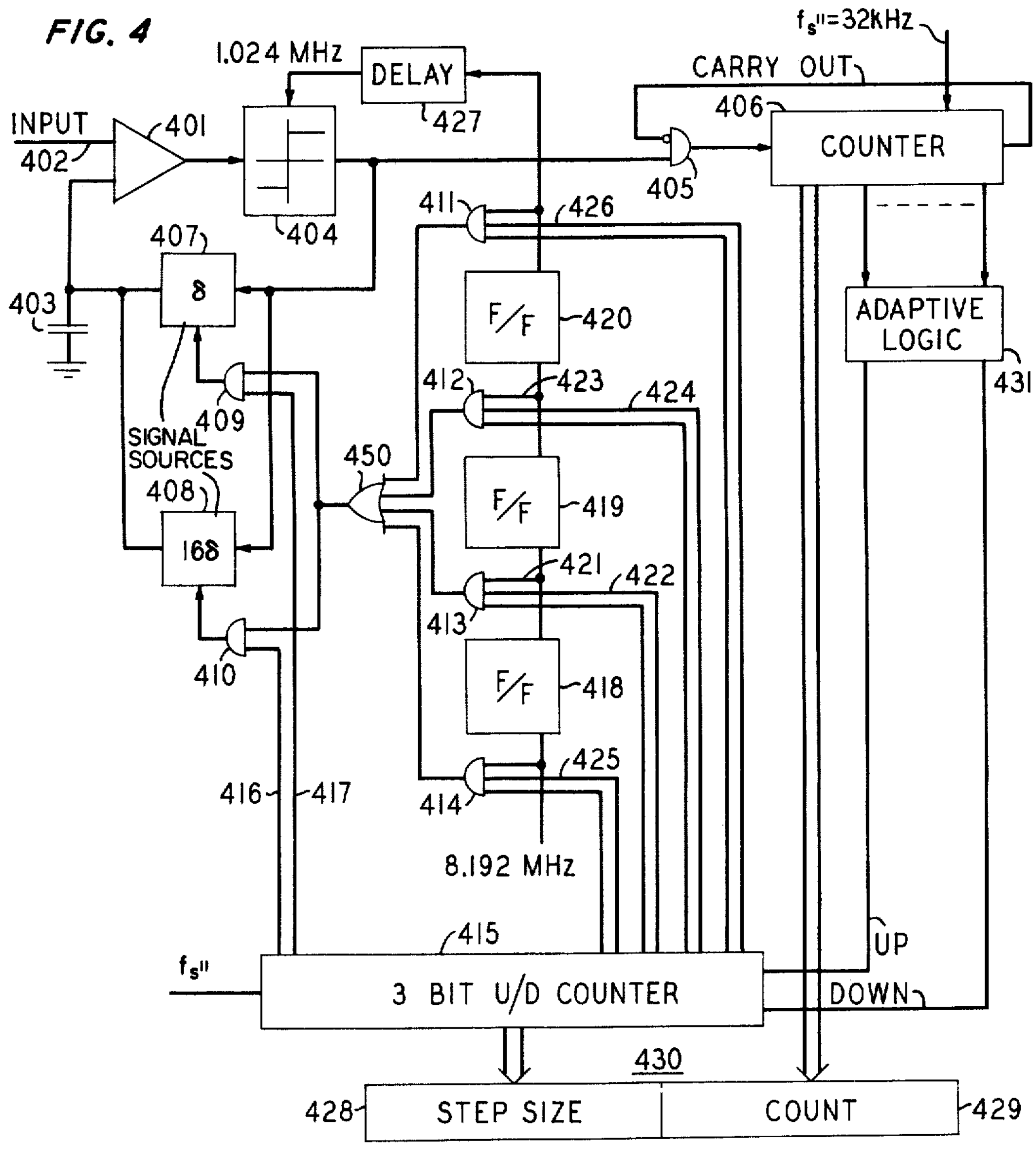
FIG. 4 shows in greater detail the system shown in FIG. 3.

FIG. 4 illustrates a typical embodiment of an adaptive DPCM encoder in accordance with the present invention. As before, a comparator 401 compares an analog input signal, appearing on lead 402, with a reference signal provided symbolically by capacitor 403. The output of the comparator 401 is applied to a latch circuit 404 which is reset at an illustrative rate $f_s$ = 1.024MHz. The latch circuit output is applied by way of AND gate 405 to counter 406 to provide the basic DM-to-DPCM conversion as in the earlier described systems. Gate 405 has an inhibit input connected to a carry lead from counter 406 to prevent a false count from being accumulated in counter 406. That is, if counter 406 illustratively contains 5 bits and is reset to the all-zero state at a rate $f_s'' = f_s/2^5$ = 32KHz, it is necessary to inhibit the (unusual) $32^{nd}$ 1 generated during the $1/f_s''$ time interval from "resetting" counter 406 to the all-zero state prior to output sampling (of the all-one contents) of counter 406.

The output from latch circuit 404 is also applied as a drive signal (indicating a required positive or negative charge) to charge parceling integrators 407 and 408, representing step sizes $\delta$ and $16\delta$, respectively. The circuits 407 and 408 are in turn gated by AND gates 409–414 and OR gate 450. The rate, $f_s''$, at which the appropriate ones of gates 409–414 select the charge parceling integrators 407 and 408 is determined by the state of the 3-bit up/down step-size counter 415. That is, the output (and its complement) for each stage of the counter 415 is applied to one of the 3-input AND gates 411–414. The output on lead 416 (and its complement on lead 417) of the most significant bit of counter 415 is used to select charge parceling integrator 408 (or 407). The frequency of pulsing of the selected charge parceling integrator is further determined by the state of the two lowest order stages of counter 415.

Countdown stages 418–420 provide at their outputs clock signals at submultiples of the basic clock signal of frequency 8.192 MHz. In particular, counter stage 418 divides the 8.192 MHz signal in half, thereby providing four clock pulses on lead 421 during each input signal clock interval of duration $1/f_s$ = 1/1.024 MHz. If counter 415 is in such a state that lead 422 is in the 1 state, these four clock pulses will be gated to the one of the charge parceling integrators 407 or 408 which is selected by a 1 signal on leads 416 or 417.

Similarly, clock stage 419 provides on lead 423 a sequence of two clock pulses during each input signal sample interval. This sequence in turn is gated to the selected one of the charge parceling integrators by a 1 signal on lead 424. In like manner, one or eight pulses are applied to the charge parceling integrator selected by the state of the most significant digit of counter 415 when lead 426 or 425, respectively, has a 1 signal on it.

It should be readily apparent that one of the charge parceling integrators 407 or 408 is pulsed 1, 2, 4, or 8 times during each input sample clock interval. This corresponds to possible step sizes of $2^i\delta$, $i$=0,1, . . . , 7. Further, consecutive possible step sizes are related by $2\delta_{j-1} = \delta_j = \delta_{j+1}/2$. From this, it is clear that given DPCM samples accumulated in counter 406 may be linearized by shifting it a number of binary digit positions indicated by the step size.

The output from counter stage 420 is also used to derive the input sample clock signal. To eliminate race conditions, and to permit the settling of integrator and comparator circuits, the signals from counter stage 420 are advantageously delayed slightly (a small portion of the input clock period) by delay unit 427.

At every DPCM sample interval, the contents of counter 415 are parallel transferred (nondestructively) to step size register 428, the contents of counter 406 are parallel transferred to register 429 and counter 406 reset to the all-zero state. The register 430 comprising the butted-together registers 428 and 429 is the output register whose contents are delivered to the transmission medium either as serial data (register 430 is then required to be a shift register) or as parallel data.

Also at intervals designated by the clock signals $f_s''$ = 32 KHz, the contents of up/down counter 415 are incremented or decremented by adaptive logic 431. Logic circuit 431, in turn, is responsive to the final count in counter 406 for the preceding $f_s''$ clock interval. The actual count ranges used to generate step size changes is quite arbitrary.

Some practical considerations dictate a particularly advantageous range of values (and associated circuitry) for the case of a 5-stage counter 406 and 3-bit up/down counter 415 discussed by way of illustration above.

Figure 5:
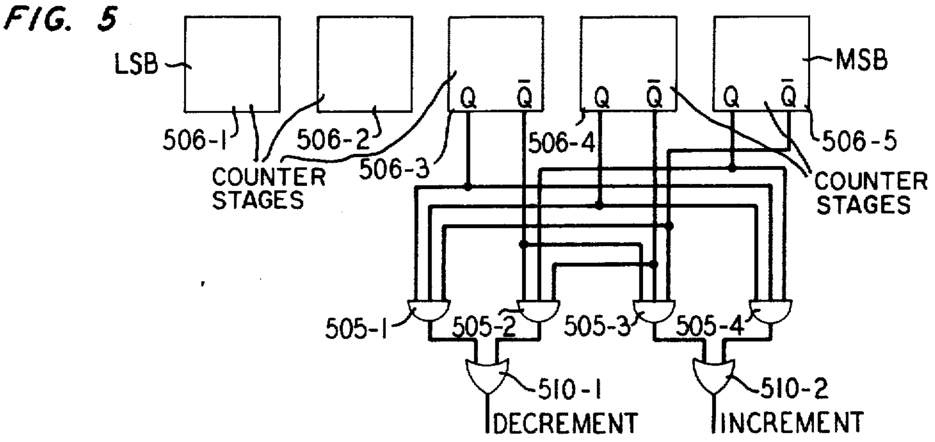
FIG. 5 shows an adaptive logic circuit useful in modifying the step size for a system like that shown in FIG. 4.

During an interval $1/f_s''$, one of the 32 possible final counts will be registered in counter 406. These final counts range from 00000, representing the DM negative slope limit condition to 11111, representing the DM positive slope limit condition. Ordinarily, it would be desirable to increase step size before such a severe slope overload was indicated. In particular, it would typically prove advantageous to increase the step size for codes 00011 or smaller and 11100 and larger. 10000 is, in the absence of the step size imbalance, a code which represents an equal number of up and down steps during an interval $1/f_s''$. This is a case where the step size should ordinarily be decreased to obtain finer resolution. Because of step size imbalance, however, the output from counter 406 may differ from 10000 (greater or less depending on the sign of the imbalance) even when the input analog signal is unchanging. Therefore, it proves advantageous to have a middle range of finite width which will include the "idle channel" counts for all expected values of step size imbalance; such a range could be 01100 to 10011. From these suggested operating criteria it is seen that the adaptive logic circuit 431 can be derived by examination of the three most significant bits only.

Where only a single step increase in step size is desired, the circuit shown in FIG. 5 may be used. There, the outputs of counter stages 506-*i*, $i$ = 3, 4, 5 having standard double rail outputs are seen to be translated by AND gates 505-*i*, $i$ = 1, 2, . . . 4 and OR circuits 510-1 and 510-2 to increment and decrement signals suitable for application to up/down counter 415 in FIG. 4. Counter stages 506-i are, of course, the stages of counter 406 in FIG. 4, with 506-1 supplying the least significant bit and 506-5 the most significant bit. Table 1 shows the bit patterns for the stages 506-*i* and the indicated effects on counter 415.

Table 1

| | |
|---|---|
| 11111<br>11110<br>11101<br>11100 | Increase |
| 11011<br>.<br>.<br>10100 | No change |
| 10011<br>10010<br>10001<br>10000<br>01111<br>01110<br>01101<br>01100 | Decrease |
| 01011<br>.<br>.<br>00100 | No change |
| 00011<br>00010<br>00001<br>00000 | Increase |

When a greater variability to signal conditions than a unit increment or decrement to counter 415 is desired, it is clear that a more complicated (but perfectly straightforward) translation of the states of counter

406 may be derived and a suitably larger increment or decrement generated. Other unit increment or decrement circuitry, e.g., based on four most significant bits, may also be derived in a manner substantially like that shown in FIG. 5.

Figure 6:
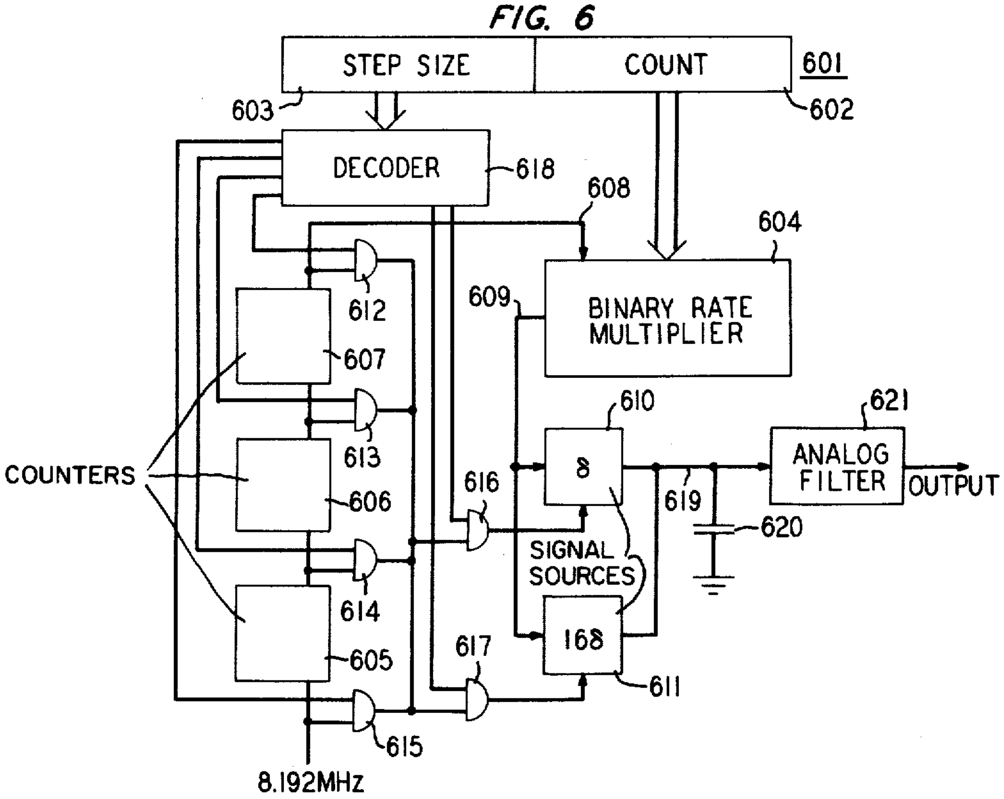
FIG. 6 shows a decoder in accordance with the present invention which performs a complementary relationship to that performed by the circuit of FIG. 4.

FIG. 6 shows a decoder circuit useful in restoring a compressed, coded DPCM signal to its original analog form. Input register 601 is seen to include a first portion 602 for storing the DPCM code, i.e., the count from counter 406 in the encoder of FIG. 4, and a second portion 603 for storing the current step size, i.e., the count stored in counter 415 at the time the DPCM sample stored in portion 602 was generated.

At intervals defined by the $f_s''$ = 32 KHz clock signal, the contents of the count register 602 are applied to a binary rate multiplier (BRM) 604. This latter circuit is of standard design, as typified by such circuits described in U.S. Pat. NOs. 2,913,179 issued on Nov. 17, 1959 to B. M. Gordon; and 2,910,237 issued on Oct. 27, 1959 to M. A. Meyer et al. Also applied to BRM 604 is a 1.024 MHz clock signal derived by counting down the applied 8.192 MHz clock signal using counters 605–607. The effect of applying the contents of register 602 to BRM 604 is to cause a fraction of the number of 1.024 MHz clock pulses applied on input lead 608 to appear on BRM output lead 609. The number of pulses on lead 609 during an interval $1/f_s''$ for a given count N in register 602 is, of course, exactly equal to (8.192 MHz/32.768 KHz) $(N/2^5) = N$.

The pulses on lead 609 are, in turn, applied to charge parceling integrators 610 and 611 representative of step sizes δ and 16δ, respectively. As in the case of the encoder in FIG. 4, a plurality of AND gates 612–617 direct clock pulses at the rate 8.192 MHz, or a submultiple thereof, to one of the charge parceling integrators 610 or 611. The selection of the particular charge parceling integrator and the selection of the particular submultiple of the 8.192 MHz clock signal is accomplished by a simple decoder 618 which merely decodes the current step size stored in register 603.

The lead 619 which receives the output from one or the other of the charge parceling integrators during a given $f_s''$ clock interval therefore impresses on capacitor 620, a differential voltage proportional to the DPCM count stored in register 602 and the step size stored in step size register 603. This voltage is, of course, combined with any previously accumulated voltage to generate an analog sample. This sample is, in turn, filtered in standard analog filter 621 to smooth or otherwise shape it for a particular application.

Figure 7:
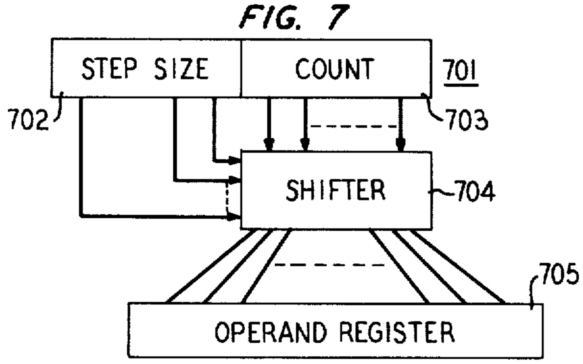
FIG. 7 shows the manner in which compressed DPCM signals may be linearized in accordance with the present invention.

FIG. 7 shows the manner in which the linearized count signals required as operands in digital filters can be generated. Thus the transmission code register 701 comprising the step size register 702 and count register 703 is seen to apply both the step size and count signals to shifter 704. Shifter 704 is of standard design and may typically assume the form of the circuit described in U.S. Pat. No. 3,747,070 issued July 17, 1973 to J. H. Huttenhoff. The shifter 704 is responsive to control signals assuming the form of the step size signals to shift the contents of the count register 703 the required distance. These linearized (shifted) contents are then deposited in operand register 705 where they are available for digital filtering, multiplexing or other operations requiring linearized signals.

It can readily be seen, that the digital encoder/decoder pair shown in FIGS. 3–6 accomplishes the desired transmission efficiencies associated with compressed, adaptive DPCM code signals, while also facilitating the required linearization of particular DPCM signals.

What is claimed is:

1. An adaptive DPCM transmission system including an encoder for generating a compressed linearizable DPCM code corresponding to a portion of an input analog signal wherein said encoder comprises a. an adaptive delta modulator comprising means for storing a reference signal representing a current step size,
b. means for accumulating a net count of the output signals of said delta modulator over a period T,
c. means responsive to said net count for adjusting said step size comprising means for changing said reference signal by an amount indicated by a corresponding value for said net count, and
d. output register means responsive to said means for accumulating, said output register means forming a composite signal wherein said composite signal comprises said net count and said reference signal before being changed.

2. Apparatus according to claim 1 wherein said means for storing said digital reference signal comprises an up/down counter, and said means for changing said reference signal comprises means for incrementing or decrementing said counter by an amount indicated by said net count.

3. Apparatus according to claim 1 wherein said means for adjusting said step size comprises a. at least one source of discrete electric charge,
b. means responsive to said changed reference signal for selecting a subset of said sources of charge,
c. a source of clock signals,
d. means responsive to said changed reference signal for selecting at least some of said clock signals, and
e. means responsive to each of said selected clock signals for keying said selected source of charge, thereby to change the voltage level.

4. Apparatus according to claim 1 further comprising an integrating circuit, wherein said step size is also indicated by a voltage level stored in said integrating circuit.

5. Apparatus for generating a linearizable DPCM code corresponding to a portion of an input analog signal comprising a. an adaptive delta modulator comprising means for storing a digital representation of the current step size,
b. means for accumulating a net count of the output signals of said delta modulator over a period T,
c. means for altering the significance of the digit positions of said accumulated net count by an amount indicated by said representation of said current step size, wherein each allowable step size is proportional to an integer power of 2 and wherein said digital representation of said current step size is N, and wherein said means for altering comprises means for shifting said net count through N binary digit positions.

6. Apparatus according to claim 1 further comprising decoding means for generating an analog signal over a period of time T, and wherein said apparatus is responsive to signals generated by said means for forming a composite signal having a first digital signal representing a compressed adaptive DPCM code word and to a second digital signal representing the step size for said DPCM code word said decoding means comprising a. at least one source of discrete electric charge each having an output,
b. a source of clock signals,
c. means responsive to said clock signals and said second digital signal for selecting a plurality of said sources of charge,
d. means responsive to said first digital signal for sequentially keying said selected plurality of said sources of charge, thereby generating a corresponding sequence of discrete electric charges, and
e. means for integrating said sequence of discrete electric charges, thereby generating said analog output signal.

* * * * *

UNITED STATES PATENT AND TRADEMARK OFFICE

CERTIFICATE OF CORRECTION

PATENT NO. : 3,922,619
DATED : November 25, 1975
INVENTOR(S) : John S. Thompson

It is certified that error appears in the above-identified patent and that said Letters Patent are hereby corrected as shown below:

Column 1, line 58, change "distrotion" to --distortion--.

Column 6, line 6, change "$f_s$"" to --$f_s$,--;

line 41, change "$2^l\delta$," to --$2^i\delta$,--.

Column 7, line 6, change "$1/f_s$"" to --$1/f_s$,--;

line 17, change "$1/f_s$"" to --$1/f_s$,--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*